United States Patent [19]

Dreibelbis

[11] 3,901,475

[45] Aug. 26, 1975

[54] PLASTIC BALL SEAT MEMBER WITH CONSTANT BLEED MEANS

[75] Inventor: Richard C. Dreibelbis, Fair Lawn, N.J.

[73] Assignee: Emerson Electric Co., St. Louis, Mo.

[22] Filed: Feb. 28, 1974

[21] Appl. No.: 446,746

[52] U.S. Cl. ............ 251/360; 137/513.5; 137/539; 137/327
[51] Int. Cl.² ........................................ F16K 15/04
[58] Field of Search............. 137/513.5, 513.7, 539, 137/327, 328, 539.5; 251/360

[56] References Cited
UNITED STATES PATENTS

| | | | |
|---|---|---|---|
| 541,633 | 6/1895 | Schoonmaker | 137/327 X |
| 2,672,888 | 3/1954 | Shields | 137/513.5 X |
| 2,701,119 | 2/1955 | Smith | 251/360 X |
| 2,731,299 | 1/1956 | Bramming | 137/513.5 X |
| 2,761,469 | 9/1956 | Hansen | 137/513.5 X |
| 3,062,416 | 11/1962 | Cooprider | 137/539 X |
| 3,062,525 | 11/1962 | Schutmaat | 137/513.5 X |
| 3,468,337 | 9/1969 | Smirl | 137/513.5 X |
| 3,768,509 | 10/1973 | Goda | 137/539 |

*Primary Examiner*—William R. Cline
*Attorney, Agent, or Firm*—Daniel H. Bobis

[57] ABSTRACT

A ball seat member made of plastic to desired dimensions for a ball type valve in a control device. The ball seat member has its external surface threaded along a substantial part thereof and is provided with a longitudinal groove in the threaded portion to prevent relative rotation of the ball seat member when it is being adjusted axially in the control device. The ball seat member has aligned longitudinal bores in from either end having different diameters to form a ball seat medially along said ball seat member and a by-pass means to bleed fluid from the upstream side to the downstream side of said ball seat past the seated ball, said by-pass means comprising a sized groove in the face of the ball seat.

2 Claims, 8 Drawing Figures

PATENTED AUG 26 1975　　　　　　　　　　　　　　　3,901,475
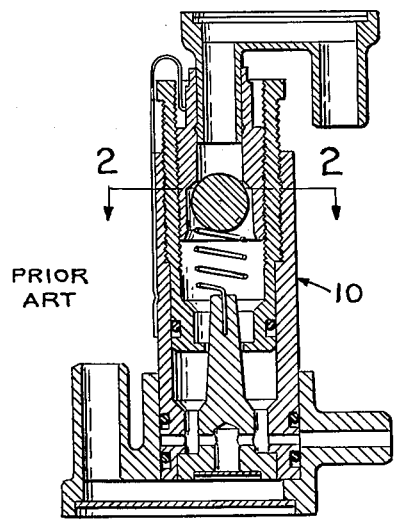
FIG. 1
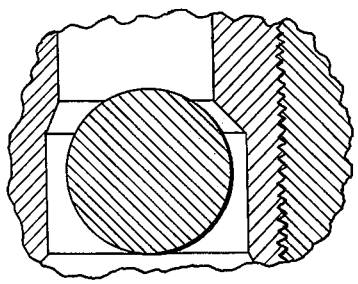
FIG. 1a
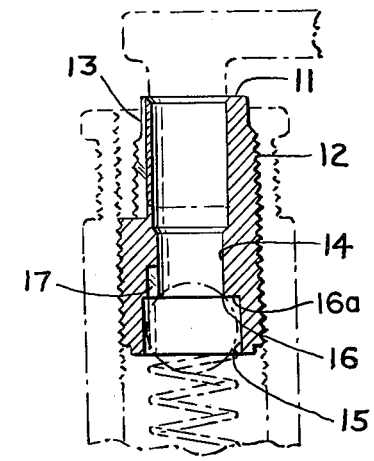
FIG. 6
FIG. 2
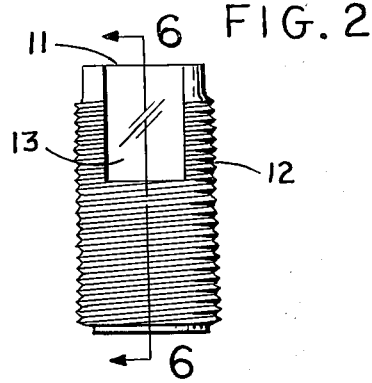
FIG. 3
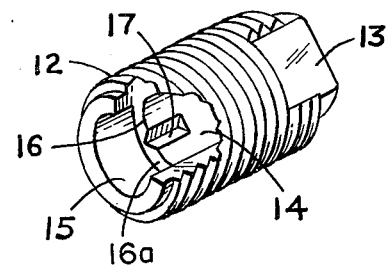
FIG. 7
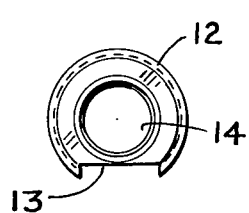
FIG. 4
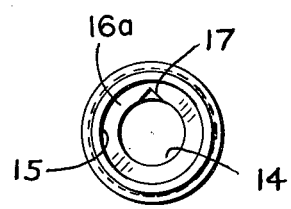
FIG. 5

PLASTIC BALL SEAT MEMBER WITH CONSTANT BLEED MEANS

BACKGROUND OF THE INVENTION

This invention relates generally to fluid handling control valves such as the type used in an air distribution unit employed to maintain substantially constant air flow in air conditioning systems and more particularly to an improved molded plastic ball seat member with constant bleed means for such fluid handling control valves.

In U.S. Pat. No. 3,653,588 an air distribution unit is disclosed which provides substantially constant flow of conditioned air to a room or area of a building regardless of variations in pressure in the supply duct. Also shown is a means of controlling the flow of conditioned air to the room to minimize overcooling, and means of adjusting the set-point of the control valve.

Air to operate the control valve and a bleed-type thermostat is obtained from the supply duct, with air flow controlled by a spring-loaded ball type valve and an adjustable orifice. Under conditions of minimum pressure in the supply duct coupled with room temperature lower than desired, the ball valve is completely closed, and the necessary pressure to operate the control system is maintained by a by-pass means which provides a passage around the spring-loaded ball mentioned above. Two forms of the by-pass means are illustrated in U.S. Pat. No. 3,653,588.

Devices of the type disclosed in U.S. Pat. No. 3,653,588 have proved to be a relatively simple and efficient means of maintaining constant flow of conditioned air to a room independent of variations in supply duct pressure. Difficulties have been encountered in the manufacture of the ball-seat member to the degree of accuracy required for reliable performance.

Thus, in the manufacture of the prior art type of ball seat members, a stock rod of a suitable metal is selected, e.g., an aluminum alloy rod. The ball seat member is machined to provide a threaded external surface and a longitudinal keying groove is cut into the threaded external surface to prevent the ball seat member from rotating but permit axial movement when it is in assembled position.

A flow passage concentric with the external surface is bored through the ball seat member and counterbored to a larger diameter to form a flat annular surface at the bottom of the counterbore which provides a ball seat where the diameter changes medially in the ball seat member.

The bleed means in such control valve may be accomplished by several methods. Thus, one method is to provide a sized escape passage in the ball operatively associated with the seat means in the ball seat member. A second method is to provide a plurality of spaced lands to form a ball seat. Thus, when the ball is seated on the lands, the upstream portion of the longitudinal bore will be connected to the downstream portion of the longitudinal bore in the ball seat member.

As a third technique the commercially utilized ball seat member sold by the Assignee of the present invention is also made from aluminum bar stock starting with the same machining process as in the prior art outlined above. This part is then subjected to secondary operations of milling the keying slot at one end of the ball seat member and cross-drilling intersecting bores, one radial to and in communication with the side of the longitudinal bore upstream of the ball seat and the other in the longitudinal line of the ball seat member communicating at one end with the radial bore and at the end remote therefrom face of the flat surface adjacent the ball seat and in communication with the side of the longitudinal bore downstream of the ball seat. This cross-drilling operation provides a by-pass about the ball seat formed in the ball seat member by the aligned longitudinal bores.

Further, however, due to the secondary machining operation it is necessary to finish the commercially utilized ball seat member by removing the burrs formed in the secondary operation and then anodizing the same to provide a harder wearing surface and protect against the effect of corrosion.

The ball seat member must maintain a close free-running fit with the mating female thread of the associated parts in the fluid control valve. Therefore, the deburring operation is absolutely essential. However, this deburring operation is difficult to control and therefore produces varying tolerances from ball seat member to ball seat member in these prior art devices. Not only is the deburring operation time consuming but additionally the fitting of the ball seat member into its operating position is also time consuming and therefore the hand labor involved elevates to a great extent the cost of this finished part.

In the present invention, the change in manufacturing from the machining of an aluminum part to the injection molding or casting of a plastic not only reduces the cost of material but more importantly reduces the amount of labor involved in both the manufacture of the part and the assembly of the part into the control valve, and eliminates anodizing to provide a further cost saving.

Thus, a substantial saving in the overall cost of the fluid control valve can be accomplished by this change in manufacture.

SUMMARY OF THE INVENTION

This invention relates generally to an improved ball seat member with constant bleed means for a fluid control valve having a ball disposed to engage said ball seat member for maintaining a desired control pressure from the fluid control valve which includes, a formed plastic member threaded on the exterior section and provided with a longitudinally extending groove to permit relative axial movement of the said plastic member when it is assembled position in the fluid control valve and to prevent relative rotation during such axial adjustment, a longitudinal bore extending from end to end in the plastic member, means in said longitudinal bore to form a ball seat medially therein, and means in the plastic member including at least one longitudinally extending interruption in the ball seat to connect the upstream portion of said longitudinal bore with the downstream portion of said longitudinal bore for bleeding fluid past the ball when the same is in seated position on the ball seat in the ball seat member.

Thus, it is an object of the present invention to provide an improved plastic ball seat with constant bleed means for a variable-volume control valve.

Other objects and advantages of the present invention will be more apparent from the description which follows below when read with the accompanying drawings in which:

FIG. 1 is a vertical section through a control valve for an air distribution system.

FIG. 1a is an enlarged fragmentary view of a portion of the control valve shown in vertical section in FIG. 1.

FIG. 2 is a cross section taken on line 2—2 of FIG. 1.

FIG. 3 is a side elevation of a plastic ball seat member with constant bleed means in accordance with the invention for use in a control valve of the type shown in FIG. 1.

FIG. 4 is a top end view of the plastic ball seat member shown in FIG. 3.

FIG. 5 is a bottom end view of the plastic ball seat member shown in FIG. 3.

FIG. 6 is a cross section taken on line 6—6 of FIG. 3 and showing the control valve partly dotted.

FIG. 7 is a perspective view of the plastic ball seat member partly broken away to show an interruption in the ball seat thereof.

DESCRIPTION OF THE PREFERRED EMBODIMENT

Referring to the drawings, FIG. 1 shows in vertical section a control valve, generally designated 10, of the type to which the present invention pertains. This control valve can be mounted in a conditioned air supply duct. The general functioning of the control valve and related components of the air distribution unit, including the purpose of the bypass around the ball valve, is fully described in U.S. Pat. No. 3,653,588. The function and operation relative to the air distribution system will not be repeated herein nor will the control valve be fully described except as it relates to the ball seat member.

In the present invention, the ball seat member is molded or cast from the suitable plastic material having the chemical and physical properties required for this purpose.

Plastic materials which meet these requirements are available on the open market. For example, a material such as Acrylonitrile-Butadiene-Styrene sold under the trademark "CYCOLAC," Polybutylene Terepthalate sold under the trademark "CELANEX" and Acetal Copolymers sold under the trademark "CELCON" might be used.

Thus, referring to FIGS. 3 to 6 of the drawings, the improved ball seat member of the present invention is shown as comprising a cylindrical element or body generally designated 11. The cylindrical element or body has threaded means 12 along substantially its entire outer surface and keying groove 13 which is functionally identical with that of the ball seat member of the prior art as above described and performs in the same manner to produce the same object or result.

FIGS. 4 and 6 show that the ball seat member 11 has longitudinal bores as at 14 and 15 formed therein which extend inwardly from opposite ends of the ball seat member in alignment with each other. The longitudinal bores 14 and 15 are of different diameters, the transition from the smaller longitudinal bore 14 to the larger bore 15 being formed by a substantially flat annular surface 16a transverse to the common axis of the bores 14 and 15. The circular edge at the intersection of the smaller longitudinal bore 14 and the flat annular surface 16a forms a ball seat as at 16 in the medial section of the ball seat member 11.

In order to provide the bleed means for the ball seat member 11 of the present invention, at least one longitudinal interruption 17 is provided such as the longitudinal groove shown in the periphery of the ball seat 16.

The longitudinal interruption or groove 17 provides the bleed means for the ball seat member 11 because when the ball is in the seated position, one end of the longitudinal bore 14 upstream of the ball seat 16 and the other end of the longitudinal interruption 17 will communicate with the longitudinal bore 15 downstream of the ball seat 16 so that the fluid can by-pass around the seated ball at all times. The volume of fluid and the rate the fluid will bleed around the seated ball will depend upon the sizing of the longitudinal interruption.

It will of course be obvious to anyone skilled in the art that more than one longitudinal interruption or groove can be formed to obtain the necessary total cross-sectional area depending upon the quantity of fluid that must be bled to maintain operation of the fluid control valve and that the shape of the longitudinal interruption or groove can be varied from the triangular shape illustrated and sized for a greater or lesser flow area.

This part can be manufactured by an injection molding process or a casting process to the required specification by the use of a properly tooled conventional single or multi-cavity mold technique and will serve to replace the machined aluminum alloy part which is subjected to the secondary operations and then anodized as above described. The plastic part can be manufactured and sold at a fraction of the cost of the aluminum part now used in the prior art, and by forming to final dimensions in the one injection molding or casting operation, will have more accurate threads and better free-running fit than can be attained with the devices of the prior art.

It will be understood that certain changes may be made from the preferred embodiment described above without departing from the scope and spirit thereof as defined in the appended claims.

What is claimed is:

1. A ball seat member for a ball type valve adjustable within a given pressure range by relative longitudinal movement of the ball seat member comprising;
   a. a cylindrical member unitarily formed from plastic material to predetermined final dimensions having an upstream end and a downstream end and threaded means on the exterior thereof by which the longitudinal position of the ball seat member may be adjusted,
   b. a first longitudinal bore extending in from the upstream end of the cylindrical member and defining a passage for control fluid,
   c. a second longitudinal bore of greater diameter than the first longitudinal bore and coaxial therewith, extending in from the downstream end of said cylindrical member,
   d. a flat annular surface connecting the first longitudinal bore and the second longitudinal bore, normal to the axis thereof, forming a ball seat,
   e. means defining at least one sized longitudinal bleed groove means of predetermined uniform transverse section molded in the wall of the first longitudinal bore and extending from the flat annular surface to a location intermediate the ball seat and the upstream end of the cylindrical member, f. the bleed-groove means having a cross-sectional area sized to permit control fluid to bleed from the upstream side of the ball seat to the downstream side at a rate equal to or greater than a predetermined minimum value when the ball is seated on the ball seat and the supply pressure is at a predetermined minimum value, and g. means defining at least one external longitudinal groove means of uniform transverse section molded into the exterior surface of the plastic cylindrical member, and having a length not less than the desired longitudinal adjustment range of the ball seat member.

2. A ball seat member as claimed in claim 1 wherein, the plastic material is an injection moldable resin such as acetal copolymer.

* * * * *